UNITED STATES PATENT OFFICE.

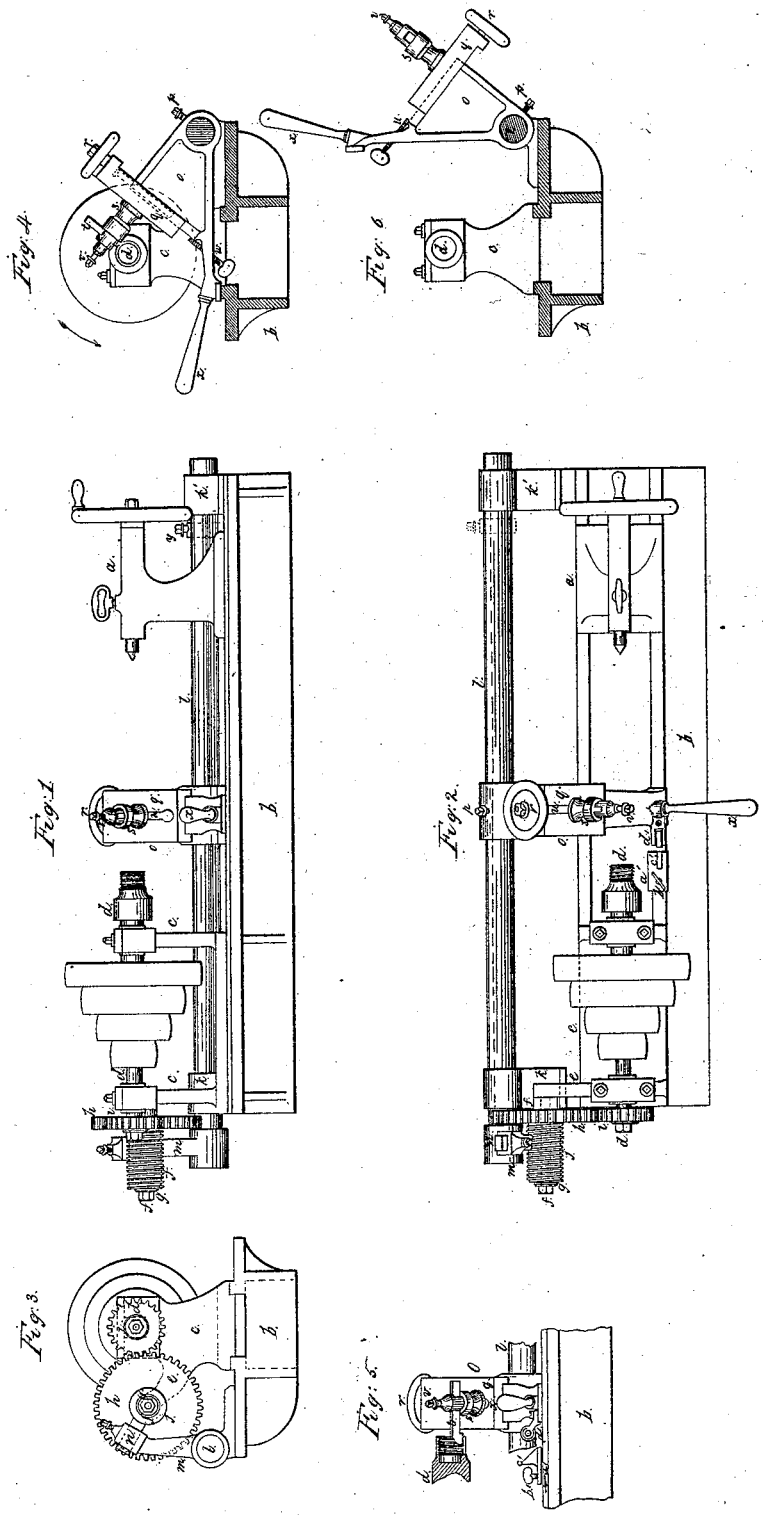

JOSEPH NASON, OF NEW YORK, N. Y.

ARRANGEMENT FOR CUTTING SCREWS IN LATHES.

Specification of Letters Patent No. 10,383, dated January 3, 1854.

*To all whom it may concern:*

Be it known that I, JOSEPH NASON, of the city, county, and State of New York, have invented certain new and useful Improvements in Machinery and Tools for Cutting the Threads of Screws, the following being a clear and exact description thereof, reference being had to the accompanying drawing, in which—

Figure 1 is a front elevation. Fig. 2 is a plan. Fig. 3 is a view of the head end of the lathe and attachments. Fig. 4 is an elevation showing the tool in its position for cutting exterior screws. Fig. 5 is an elevation showing the position of the tool for cutting interior screws. Fig. 6 is an elevation showing the tool thrown back out of use.

My improvements, although designed to facilitate the process of threading screws generally, which have their threads cut by rotation in the lathe against a sliding tool, are more especially intended to supersede the well known process of "hand chasing," to which end they are made auxiliary to the usual and requisite functions of a screw cutting lathe—such as, centering, turning and boring—and their chief novelty consists in their adaptation to, and combination with the turning lathe, so as not in any manner to interfere with or hinder the ordinary routine of manipulation, either preparatory to, or after the operation of screw cutting.

The construction, is as follows: The tail stock ($a$) and rail of the lathe ($b$) are like those in common use, as is also the head stock ($c$) with the additions about to be described. Upon the rear side of one of the posts of the head stock ($c$) is an extension or bracket ($e$) supporting a stud ($f$) which projects outward parallel to the axis of the mandrel ($d$). Fitted to the stud is a tube ($g$) which is turned upon it by the toothed wheel ($h$) driven by the pinion ($i$) upon the mandrel. This tube receives and gives motion to the guide screw ($j$) which goes over and is fastened to it by a slot and key. A nut upon the end of the stud forms the end bearing of the tube and guide screw, and is unscrewed when the guide screw is to be removed or changed.

The two wheels ($h$) and ($i$) should have in their number of teeth a common multiple. They are seldom or never removed and their diameters are made dissimilar only for the purpose of giving to the guide screw ($j$) a slower rate of motion than that of the mandrel ($d$) whereby it may be made of coarser pitch than that of the screw to be cut and its wear materially lessened.

Upon the back rail of the lathe are two eyes or bearings ($k$ $k$) supporting the shaft ($l$) which extends the whole length of the lathe (or less) and is very accurately fitted to the bearings ($k$ $k$) yet so as to turn or slide freely. On the head end of the shaft ($l$) is fastened the guide arm ($m$) which projects forward over the guide screw ($j$) and has at its termination a socket to hold the threaded block ($n$) which engages with the thread upon the guide screw ($j$). The block ($n$) is held in the socket by a screw and is to be removed along with the guide screw to which it belongs, whenever a change of thread is required.

The thread on the block, should correspond exactly to that on the guide screw. A simple and effective mode of obtaining this correspondence is to make first a duplicate in steel of the intended guide screw and cross-groove the threads so as to form cutting teeth after the fashion of an ordinary "master tap." With this cutter prepare a chasing tool in the usual manner. With the chasing tool cut the thread upon the guide screw—which will then be an exact copy of the cutter. Finally, place the cutter upon the tube ($g$) and while it is rotating press the block ($n$) against it until a thread is cut in the block of the required depth. Upon removing the cutter and replacing the guide screw, the two threads, namely—upon the guide screw and block—will fit each other perfectly.

Upon the shaft ($l$) between its bearings ($k$ $k$) is a tool bearer ($o$) which can be moved along the shaft and fastened at any point desired by the screw ($p$). The tool bearer is of triangular form as shown in Figs. 4 and 6. Its lower arm extends forward across the rails when in its working position, and rests firmly upon the front rail upon which it is at liberty to slide freely. From the lower arm rises an inclined face having a dovetail section, and carrying the slide rest ($q$) which is moved up and down by the hand screw ($r$).

The tool post ($s$) rests upon the face of the slide rest ($q$) and holds a cutting tool ($t$) the under or cutting side of which nearly intersects the center of the lathe mandrel. The slot ($u$) in the slide rest assists in adjusting the tool to the work. The tool post and tool are both held in place by the screw (v). The set screw (w) acts as a stop to the slide post and determines the depth to which the thread of the screw shall be cut. The cutting tool may have either a single point or several teeth like a common chasing tool, the latter being in most cases preferable. The same tool post is employed for cutting exterior and interior threads by merely changing its position as shown in Figs. 4 and 5.

The tool bearer, shaft and attachments are moved and operated by taking hold of the handle (x). The collar (y) which is movable upon the shaft is occasionally used to arrest the back motion of the shaft and tool bearer by its contact with the bearing (k).

A supplementary device called a "tool lifter" is shown in Figs. 2 and 5. ($A^1$) represents a block having a deep groove which embraces and slides upon the front rail of the lathe to which it may be fastened at any desired point by the thumb screw ($b^1$). Upon its upper side is the short inclined plane ($c^1$), having an angle of about 45 degrees. Upon the forward extremity of the tool bearer is a small roller ($d^1$) which upon passing the inclined plane lifts the tool bearer from its front bearing, the block from the guide screw, and the cutting tool from the work. The tool lifter is chiefly employed when screws are to be cut against shoulders or projections, or when one or more threads are to terminate abruptly.

The operation is as follows: The piece to be threaded having been turned or bored, the tool bearer (which during this operation has been thrown back in the position shown in Fig. 6) is brought down into the position shown in Figs. 1, 2, 4 and 5, when it rests upon the front rail of the lathe and is made to traverse endwise by the guide screw (j), which now engages the block (n). The cutting tool (t) is next brought down to the work as shown in Figs. 4 and 5, and as it moves over the work the depth of the cut is adjusted by the screw (r). Having described the thread to the required length the tool bearer is suddenly raised high enough to disengage the block from the guide screw and the tool from the work, both of which operations it is to be observed are made simultaneous by the connection of the tool bearer and block with the shaft (l). The tool bearer may be raised by the hand or by the tool lifter before described. The shaft (l) and its attachments being thus set at liberty are to be carried back by the hand to their original position, which may be determined and fixed if necessary by fastening the collar (y) at the proper point upon the shaft. The tool bearer is again brought down to its working position, the tool advanced for a second cut, and the forward, lifting, and back motions gone through with as before. These operations are to be repeated until the thread is cut to the depth required. When one or more duplicate screws are to be threaded, the depth of the cut is regulated by the gage screw (W). To lessen the labor of moving the shaft and attachments through the back motion, it is usual to employ a weight attached to a chain, which passing over a pulley is connected to the back end of the shaft. These parts are not shown in the drawings.

Having thus fully described my improvements, I remark that several of the parts which enter into the combination herein set forth having been previously known and used, I do not claim them separately as my invention. The slide rest and guide screw more especially have been long employed together for the purpose of cutting the threads of screws. I do not therefore claim either of these parts separately or in any combination in which they have been heretofore employed in the process of screw cutting.

I claim as my invention:

1. The mode of constructing and combining the stud, the tube, and the guide screw, by which guide screws of the various patterns used in screw cutting may be put on or taken off expeditiously.

2. The mode of constructing the tool bearer generally, particularly as regards placing the slide rest behind the work whereby the cutting tool is brought into such relative position with the shaft and the mandrel that the operation of raising the tool bearer from the rail removes the tool from the work.

3. The tool lifter constructed substantially as described and employed for the purposes, and in the manner herein specified.

4. The combination of the guide screw, the threaded block, and the tool bearer with the shaft, substantially as set forth, by which (1) the requisite traversing motion is imparted to the cutting tool, (2) the operations of releasing the block from the guide screw, and removing the tool from the work are simultaneously performed, and (3) the tool bearer may be turned back out of the way when not in use.

JOSEPH NASON.

Witnesses:
J. J. GREENOUGH,
RICHARD WINNE.